United States Patent [19]

Wang et al.

[11] Patent Number: 5,237,679

[45] Date of Patent: Aug. 17, 1993

[54] METHOD AND SYSTEM FOR AUTOMATIC DELETION OF A FOLDER HAVING TEMPORARY DOCUMENT RELATIONSHIPS WITHIN A DATA PROCESSING SYSTEM

[75] Inventors: Diana S. Wang, Trophy Club; Marvin L. Williams, Lewisville, both of Tex.

[73] Assignee: International Business Machines Corporation, Armonk, N.Y.

[21] Appl. No.: 528,625

[22] Filed: May 24, 1990

[51] Int. Cl.⁵ .............................................. G06F 7/00
[52] U.S. Cl. .............................. 395/600; 364/DIG.; 364/962; 364/974
[58] Field of Search .......................................... 395/600

[56] References Cited

U.S. PATENT DOCUMENTS 5,089,956  2/1992  McPhail ............................ 395/600
5,101,345  3/1992  McPhail ............................ 395/600

*Primary Examiner*—Gareth D. Shaw
*Assistant Examiner*—A. Katbab
*Attorney, Agent, or Firm*—Andrew J. Dillon

[57] ABSTRACT

A method is disclosed for automatically deleting a temporary document relationship within a data processing system. A relationship between one document and one or more documents is specified as a temporary document relationship. Thereafter, each time a document is to be deleted from the data processing system, all relationships of that document are examined to determine if any have been specified as temporary document relationships. After all documents linked to a selected document by a temporary document relationship have been deleted, the selected document itself is automatically deleted by the system. In this manner, a temporary electronically designated folder may be created to store a plurality of documents in a linear and hierarchical manner. After the last document within the folder has been deleted, the folder itself is automatically deleted by this system. Similarly, a temporary stapler document relationship may be created by stapling a first document to a second document. In accordance with the method of the present invention, the deletion of either document will result in the automatic deletion of the remaining document in the staple relationship.

4 Claims, 3 Drawing Sheets

METHOD AND SYSTEM FOR AUTOMATIC DELETION OF A FOLDER HAVING TEMPORARY DOCUMENT RELATIONSHIPS WITHIN A DATA PROCESSING SYSTEM

BACKGROUND OF THE INVENTION

1. Technical Field

The present invention relates in general to methods for improving data processing systems and in particular to methods for creating temporary document relationships between documents in a data processing system. Still more particularly the present invention relates to methods of creating temporary document relationships which may be automatically deleted upon the removal of one or more documents.

2. Description of the Related Art

Complex data processing system are well known in the prior art. Large distributed data processing systems typically include multiple resource managers or library services which serve to maintain multiple data objects or documents which may be utilized are temporarily removed by users within the data processing system. The sheer magnitude of the number of data objects within a modern state-of-the-art data processing system make it necessary to arrange those data objects in a linear and/or hierarchical manner. This may be accomplished in several different ways.

For example, a system known as Document Interchange Architecture (DIA) is utilized in International Business Machines' systems to define sets of services which are performed by processes implemented in the uppermost layer of International Business Machines' System Network Architecture (SNA). The Document Interchange Architecture (DIA) is utilized to define the protocols and data streams which are necessary to interchange information such as documents and messages in a consistent and predictable manner. In general, Document Interchange Architecture (DIA) is not concerned with the content of a document being interchanged and the term document is utilized herein to define any collection of data.

Within the Document Interchange Architecture (DIA) document library services are utilized for storing, searching, and retrieving documents electronically. These functions are analogous to manually filling and retrieving paper documents in a paper office system. A document library service typically makes use of document profiles for searching through documents within a library service. These document profiles may be utilized to locate all documents related to a selected topic, all documents having a selected author, and/or all documents received at the library services between two selected dates.

As an adjunct to a document library service, it is now possible to electronically group multiple documents together in a manner which is analogous with paper office techniques. For example, an electronically designated "folder" may be created which allows a user to group multiple documents together in a linear and hierarchical structure. A hierarchical relationship may be created by simply nesting together multiple document folders. Similarly, a linear relationship is created by placing a set of documents in a user specified position within a folder. The concept of electronically designated folders is more fully disclosed in U.S. patent application Ser. No. 138,539, filed Dec. 23, 1987, entitled "Methods of Logically Organizing Documents In A System," now abandoned.

A second form of electronic grouping of documents is disclosed in U.S. patent application Ser. No. 277,387, as parent of continuation application Ser. No. 07/631,193, filed Nov. 29, 1988, entitled "Method Of Filling Stapled Documents," in which a so-called "staple" relationship is disclosed. A staple relationship is a one-to-one relationship between two documents in which one document ("stapler") is electronically associated with a second document ("staplee").

In both of the foregoing procedures a relationship is established between a document and one or more additional documents. Often it would be desirable for a document relationship to be dependent upon the existence of another document in a manner which permits the automatic deletion of the relationship in response to the deletion of a document; however, it is currently necessary for a user to explicitly delete a relationship after it is no longer being utilized.

SUMMARY OF THE INVENTION

It is therefore one object of the present invention to provide a method for improving data processing systems.

It is another object of the present invention to provide an improved method for creating temporary document relationships between documents in a data processing system.

It is yet another object of the present invention to provide a method of creating temporary document relationships which may be automatically deleted upon the removal of one or more documents.

The foregoing objects are achieved as is now described. The method of the present invention permits a relationship between one document and one or more documents to be specified as a temporary document relationship. Thereafter, each time a document is to be deleted from the data processing system, all relationships of that document are examined to determine if any have been specified as temporary document relationships. After all documents linked to a selected document by a temporary document relationship have been deleted, the selected document itself is automatically deleted by the system. In this manner, a temporary electronically designated folder may be created to store a plurality of documents in a linear and hierarchical manner. After the last document within the folder has been deleted, the folder itself is automatically deleted by this system. Similarly, a temporary stapler document relationship may be created by stapling a first document to a second document. In accordance with the method of thee present invention, the deletion of either document will result in the automatic deletion of the remaining document in the staple relationship.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
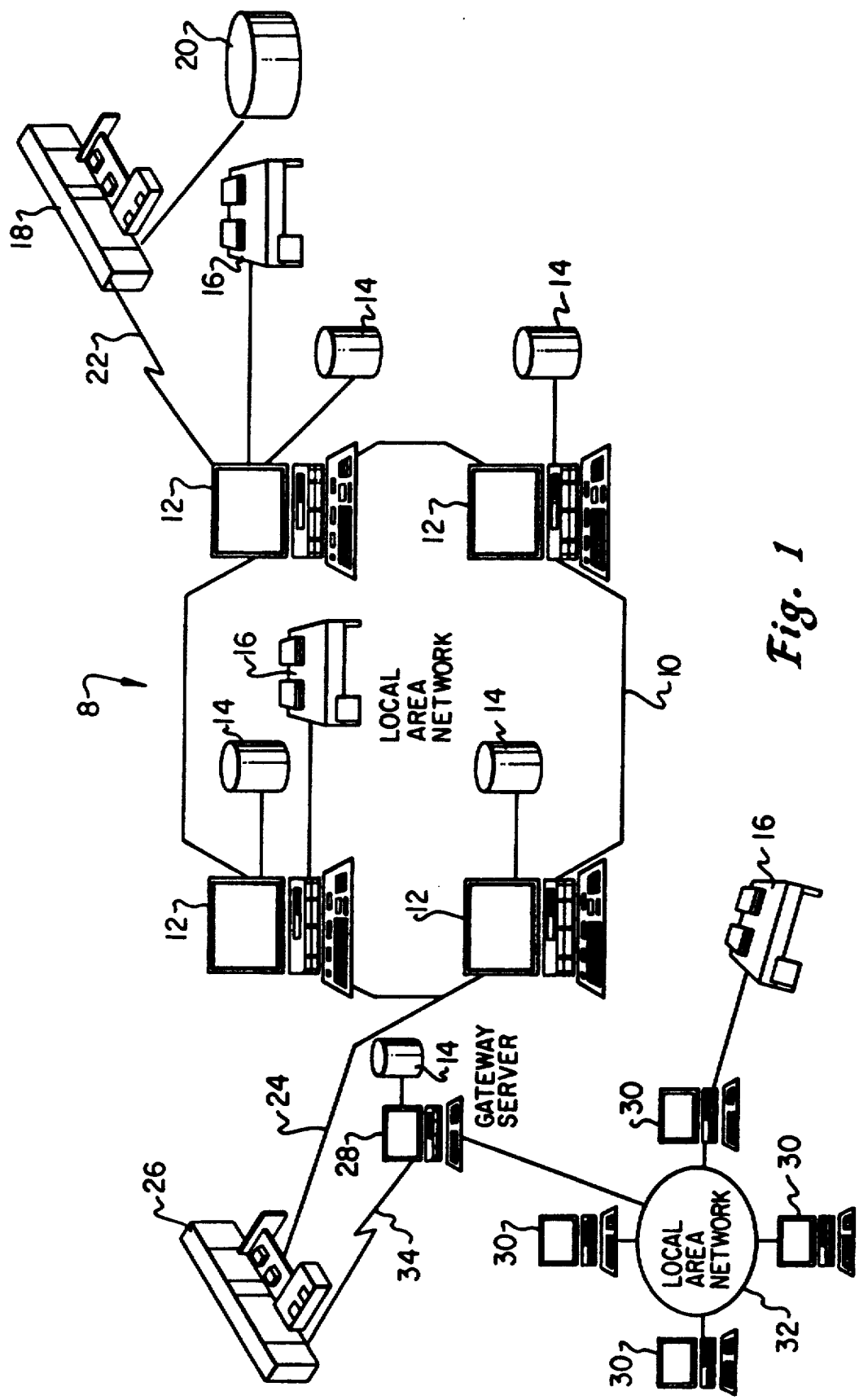
FIG. 1 is a pictorial representation of a distributed data processing system which may be utilized to implement the method of the present invention.

With reference now to the figures and in particular with reference to FIG. 1, there is depicted a pictorial representation of a data processing system 8 which may be utilized to implement the method of the present invention. As may be seen, data processing system 8 may include a plurality of networks, such as Local Area Networks (LAN) 30 and 32, each of which preferably includes a plurality of individual computers 12 and 30, respectively. Of course, those skilled in the art will appreciate that a plurality of Intelligent Work Stations (IWS) coupled to a host processor may be utilized for each such network.

As is common is such data processing systems, each individual computer may be coupled to a storage device 14 and/or a printer/output device 16. One or more such storage devices 14 may be utilized, in accordance with the method of the present invention, to store the various data objects or documents which may be periodically accessed and processed by a user within data processing system 8, in accordance with the method of the present invention. In a manner well known in the prior art, each such data processing procedure or document may be stored within a storage device 14 which is associated with a Resource Manager or Library Service, which is responsible for maintaining and updating all resource objects associated therewith.

Still referring to FIG. 1, it may be seen that data processing network 8 may also include multiple mainframe computers, such as mainframe computer 18, which may be preferably coupled to Local Area Network (LAN) 10 by means of communications link 22. Mainframe computer 18 may also be coupled to a storage device 20 which may serve as remote storage for Local Area Network (LAN) 10 may be coupled via communications controller 27 and communications link 34 to a gateway server 28. Gateway server 28 is preferably an individual computer or Intelligent Work Station (IWS) which serves to link Local Area Network (LAN) 32 to Local Area Network (LAN) 10.

As discussed above with respect to Local Area Network (LAN) 32 and Local Area Network (LAN) 10, a plurality of data processing procedures or documents may be stored within storage device 20 and controlled by mainframe computer 18, as Resource Manager or Library Service for the data processing procedures and documents thus stored. Of course, those skilled in the art will appreciate that main frame computer 18 may be located a great geographical distance from Local Area Network (LAN) 10 and similarly Local Area Network (LAN) 10 may be located a substantial distance from Local Area Network (LAN) 32. That is, Local Area Network (LAN) 32 may be located in California while Local Area Network (LAN) 10 may be located within Texas and mainframe computer 18 may be located in New York.

As will be appreciated upon reference to the foregoing, it would be desirable for a user within distributed data processing network 8 to be able to establish a temporary relationship between one or more data objects or documents stored within data processing network 8 in a manner such that upon the deletion of all documents related to a first document within the data processing system the first document in the temporary document relation will be automatically deleted from the data processing system.

Figure 2:
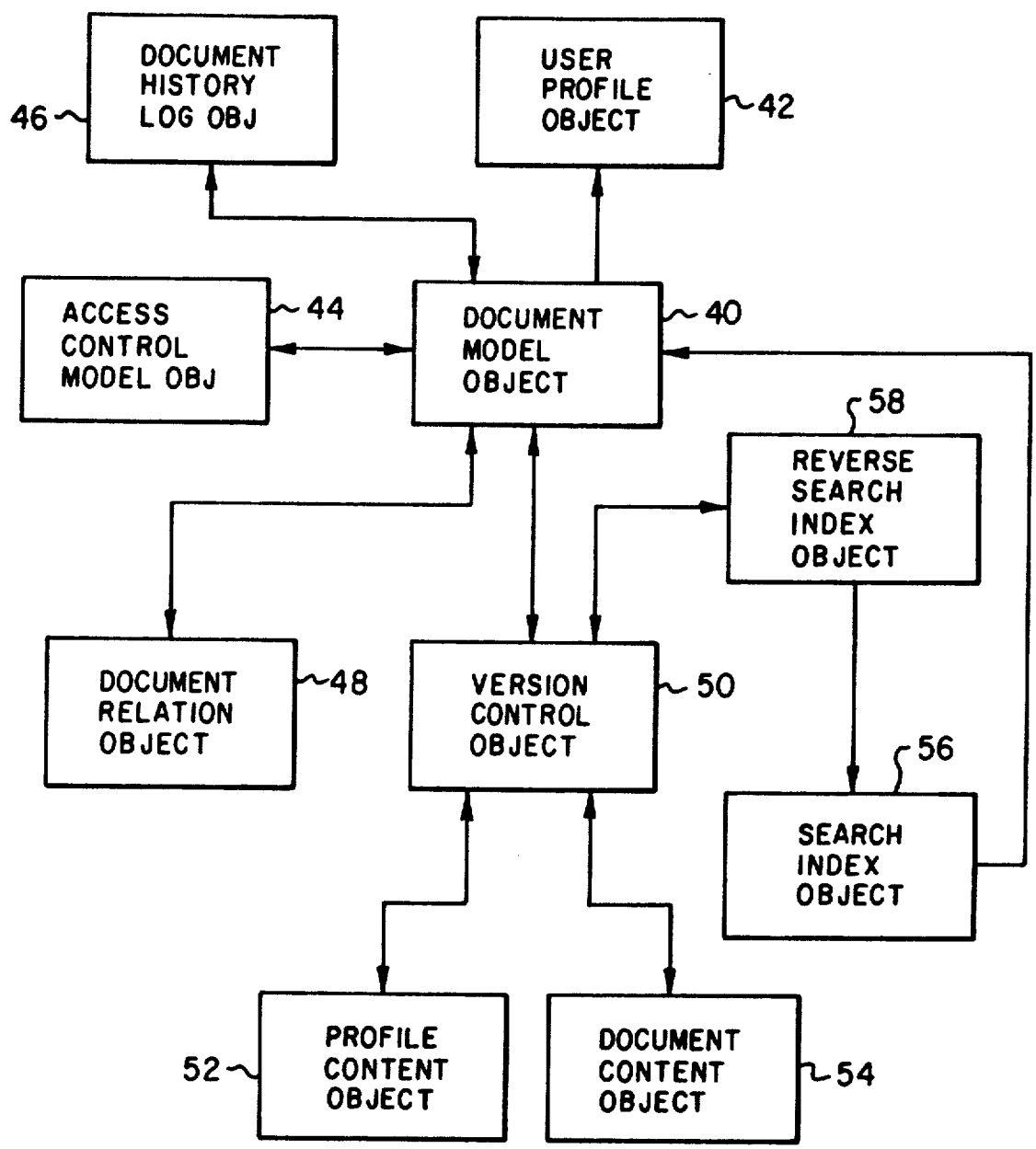
FIG. 2 is a graphic depiction of a document model object which may be utilized with the method of the present invention.

Referring now to FIG. 2, there is depicted a graphic representation of a document model object which may be utilized with the method of the present invention. As is illustrated, document model object 40 includes a plurality of objects associated therewith which are typically created and/or maintained by a library service.

Document model object 40 is the heart of the library service model. Logically, it is typically the first object created when a document is filed for the first time within a library service. Document model object 40 typically contains information concerning ownership and attributes of the particular document. This object is the base object for all access to the document during its lifetime within a library service.

Within the Document Interchange Architecture (DIA) document model object 40 typically contains those attributes of the document which govern the execution of Document Interchange Architecture (DIA) commands which refer to the document. For example, document model object 40 may contain document instance attributes, such as editable or non-editable, maximum number of versions permitted, an indication of the action to be taken if an attempt is made to edit a noneditable document, or to exceed the maximum number of versions. Similarly, document model object 40 may contain locking information as well as information indicating the document content, date and time information and information relating to the location of information which has been removed from the direct control of the library service.

Access control model object 44 is typically created when a document is filed for the first time into a Document Interchange Architecture (DIA) Library. Access control model object 44 is utilized as part of the Reference Monitor database and generally contains access control information which may be utilized to identify those users or groups of users to whom some form of access authority to the document has been granted.

Document history log object 46 may be optionally created when a document is filed within a library service and may be utilized to record various activities which take place with regard to the document. Typically, document history log object 46 is preserved with an associated document until such time as the document is deleted from the library service.

Document relation object 48 is utilized to describe the logical relationships between the present document and other documents. For example, if the present document is a folder, then each document which is contained within the folder has a pointer entry within document relation object 48. If the present document is stored within one or more folders, then each folder has a pointer entry within document relation object 48. Additionally, if the present document is stapled to another document, then each document to which this document is stapled has a pointer entry within document relation object 48. In accordance with the method of the present invention document relation object 48 may be utilized to provide an indication of whether or not a specified logical relationship is a temporary document relationship. That is, a relationship which maybe automatically deleted upon the deletion of all related documents.

Version control object 50 may be utilized to support multiple named versions of the present document. Typically, version control object 50 resides in the same memory space as the associated document model object and is utilized to provide an anchor for several objects which may comprise a single named version of the document and to provide space for version naming, version locks and other version level process controls.

Profile content object 52 is utilized to support the storage and maintenance of the Interchange document profile. An application may choose to create sub-objects for one or more sub-profiles of a particular document and profile content object 52 may then be utilized as an anchor for these sub-profiles. Document content object 54 provides for storage of the document content and for storing information concerning the actual size, and various units of measurement, of the filed document content.

Search index object 56 is utilized to maintain a parametric search index containing search terms which have been identified during the creation and filing of a document. Typically, the library process scans profile content object 52, document relation object 48 and access control model object 44 to locate terms which may be utilized to support a parametric search.

Finally, reverse search index object 58 is generally utilized to support the removal of search index entries when a document associated with an entry has been removed from the library service by means of a delete command. Within the Document Interchange Architecture (DIA) library service, parametric search terms associated with a file document may be added or deleted automatically as a result of the addition or deletion of data objects.

Figure 3:
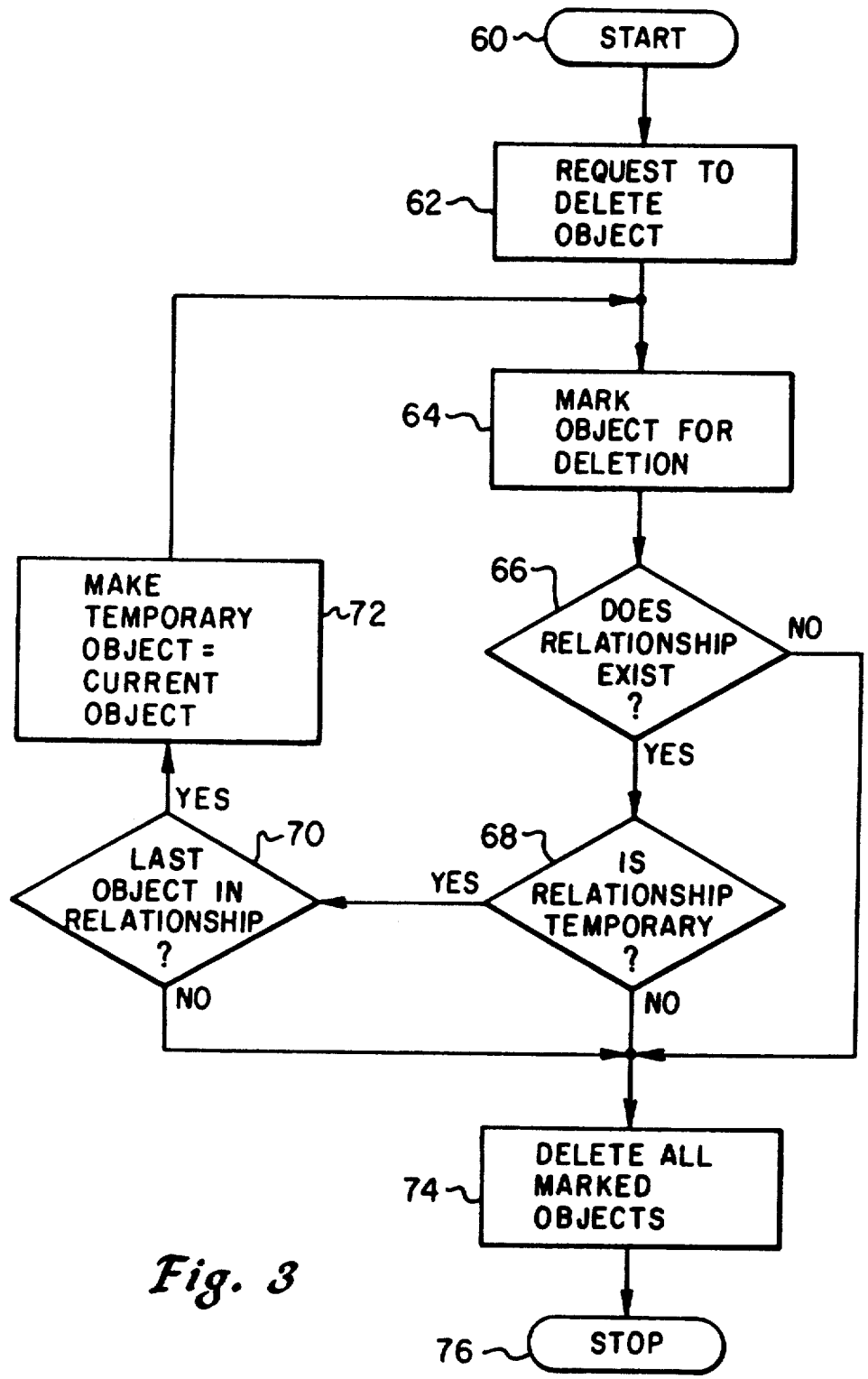
FIG. 3 is a high level flow chart depicting the automatic deletion of a temporary document relationship in accordance with the method of the present invention.

With reference now to FIG. 3, there is depicted a high level flow chart which illustrates the automatic deletion of a temporary document relationship in accordance with the method of the present invention. As is illustrated, the process begins at block 60 and thereafter passes to block 62 which illustrates a request by a user within the data processing system to delete a particular object stored therein. Next, block 64 illustrates the marking of that object for deletion.

Thereafter, in accordance with an important feature of the present invention, block 66 depicts a determination of whether or not a relationship exists between the document to be deleted and any other document within the data processing system. This is accomplished, in accordance with the method of the present invention, by a review of the document relation object 48, as depicted within FIG. 2.

In the event document relation object 48 of FIG. 2 indicates that the document to be deleted is not a part of any relationship within the data processing system, then the process passes to block 74 wherein all marked objects are deleted. Thereafter, the process passes to block 76 and terminates.

Referring again to block 66, in the event a review of the document relation object 48 of FIG. 2 indicates that the document to be deleted forms a portion of a relationship with another document, then block 68 illustrates a determination of whether or not the relationship thus discovered is a temporary document relationship. That is, a relationship with a document which has been designated as a temporary document in accordance with the method of the present invention.

If the relationships documented within document relation object 48 are not relationships with a temporary object, as determined in block 68, then the process again passes to block 74 and all marked objects within the data processing system are deleted. Again, the process thereafter terminates at block 76.

Referring again to block 68, in the event the relationship between the document to be deleted and a second document is a temporary document relationship, then the process passes to block 70 which illustrates a determination of whether or not the object in the temporary document relationship to be deleted is the last object within the relationship.

This determination is important in view of the various types of relationships which have been described above. For example, in a staple relationship wherein a one-to-one relationship exists between a first document and a second document, the deletion of one document from a relationship which has been designated as temporary will necessitate the automatic deletion of the second document, in accordance with the method of the present invention. However, the folder relationship described above may be characterized as a temporary folder relationship in which multiple documents are stored within a temporary folder. In this case the temporary folder should not be deleted upon the deletion of a single document within that folder unless the document being deleted is the last object within the temporary folder. Upon the deletion of the last document within a temporary folder, the temporary folder will then be automatically deleted in accordance with the method of the present invention.

Referring again to block 70, if the document to be deleted is not the last object within the temporary document relationship, indicating the remaining the documents within the relationship should not be automatically deleted, then the process passes to block 74 wherein all marked objects are deleted and the process is terminated, as illustrated in block 76.

However, in the event the document to be deleted is the last object within a temporary document relationship the process passes to block 72, wherein the remaining temporary object is set as the current object, and the process returns iteratively to block 64 wherein the current object is again marked for deletion.

Those skilled in the art will appreciate upon reference to the foregoing that utilizing the method of the present invention it will be possible to iteratively nest multiple temporary objects. For example, a temporary folder any contain a temporary sub-folder which contains a single document. Since folders and sub-folders are also documents, the deletion of the single document within the temporary sub-folder will, in accordance with the method of the present invention cause the automatic deletion of the temporary sub-folder. Thereafter, the deletion of the temporary sub-folder will cause the automatic deletion of the temporary folder. In this manner, large numbers of nested relationships may be automatically deleted when the requirement for those relationships is no longer present.

Upon reference to the foregoing those skilled in the art will appreciate that the Applicants in the present application have created a method whereby a user may specify that a document is to be deleted after the final relationship for that document is no longer in effect, while permitting the user to be oblivious to all possible future relationships which that document may achieve. The method of the present invention permits users to specify documents which are only significant in terms of the relationships which those documents have with other documents and wherein the document may be automatically deleted after those relationships have been terminated. This invention also permits the user to maximize storage space within a data processing system by enabling the automatic deletion of temporary folders or temporary stapler documents upon the termination of the relationships between those documents and any other documents within the system.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system having a plurality of documents stored within an electronically designated folder for efficiently managing relationships between said plurality of documents, said method comprising the data processing system implemented steps of:
   specifying a relationship between each document stored within said electronically designated folder within said data processing system and said electronically designated folder as a temporary document relationship;
   automatically determining whether a selected document stored within said electronically designated folder within said data processing system is the last remaining document stored within said electronically designated folder is response to a request from a user of said data processing system to delete said selected document from said data processing system; and
   automatically deleting said electronically designated folder from said data processing system in response to the deletion of said last remaining document stored therein.

2. The method in a data processing system having a plurality of documents stored within an electronically designated folder for efficiently managing relationships between said plurality of documents according to claim 1, further including the data processing system implemented step of determining whether said user has authority to delete said selected document.

3. A data processing system for efficiently managing relationships between multiple documents among a plurality of documents stored within an electronically designated folder within said data processing system, said data processing system comprising:
   means for specifying a relationship between each document stored within said electronically designated folder within said data processing system and said electronically designated folder as a temporary document relationship;
   means for automatically determining whether a selected document stored within said electronically designated folder within said data processing system is the last remaining document stored within said electronically designated folder in response to a request from a user of said data processing system to delete said selected document; and
   means for automatically deleting said electronically designated folder from said data processing system in response to the deletion of said last remaining document stored therein.

4. The data processing system for efficiently managing relationships between multiple documents among a plurality of documents stored within an electronically designated folder within said data processing system according to claim 3, further including means for determining whether said user has authority to delete said selected document.

* * * * *